UNITED STATES PATENT OFFICE.

WILLIAM WILKINSON McIVER, OF NEW YORK, N. Y.

FLUX FOR BRAZING METALS.

965,647.     Specification of Letters Patent.     Patented July 26, 1910.

No Drawing.     Application filed September 14, 1909. Serial No. 517,718.

*To all whom it may concern:*

Be it known that I, WILLIAM WILKINSON MCIVER, a citizen of the United States, and a resident of the city of New York, borough of Manhattan, in the county and State of New York, have invented a new and Improved Flux for Brazing Metals, of which the following is a full, clear, and exact description.

The object of the invention is to provide a new and improved flux for use in brazing broken or fractured metals, notably cast iron, in a very simple, inexpensive and efficient manner.

The process consists in subjecting the joint of the broken or fractured metal to heat until the metal appears bright red, then subjecting a powerful, fusible, reducing flux and brazing solder to the action of the heat of the metal, to cause a fusion of the flux and solder and a reduction of the metal at the joint for the flux and solder to enter the joint and insure a solid brazing thereof.

The flux consists of the following ingredients in about the proportions specified, namely, one part by weight of granulated cyanid of potassium and two parts by weight of granulated glass borax. The ingredients are thoroughly mixed by suitable means, the mixture forming a powerful reducing flux, which is used in connection with brazing solder when brazing broken or fractured cast iron or other metal.

When using the mixture it is sprinkled onto the joint in an amount proportioned to the thickness of the broken or fractured metal. The brazing solder used is preferably that known to the trade as Hungerford's No. 24. In carrying out the brazing process the broken metal pieces are fitted together and secured in position by a suitable clamping device, and then the broken joint is subjected to heat by the action of a blow pipe or other suitable means until the metal at the joint shows bright red. The flux above mentioned is preferably first applied by placing it on the joint and this flux is fused by the heat of the metal, thus causing a reduction of the latter at the joint. The granulated brazing solder is now immediately placed onto the joint and is melted by the heated metal, and the melted flux and solder readily penetrate into the joint, to insure a firm brazing together of the broken parts, it being understood that the flux, besides the reducing action referred to, insures a perfect cleaning of the joint, to render the brazing solder very effective in brazing the parts together.

Having thus described my invention, I claim as new and desire to secure by Letters Patent:

1. A flux for use in brazing metals, consisting of cyanid of potassium and borax.

2. A flux for use in brazing cast iron, consisting of granulated cyanid of potassium and granulated glass borax.

3. A flux for brazing metals consisting of the following ingredients in substantially the proportions set forth by weight; granulated cyanid of potassium one part, granulated glass borax two parts, the said ingredients being thoroughly mixed.

In testimony whereof I have signed my name to this specification in the presence of two subscribing witnesses.

WILLIAM WILKINSON McIVER.

Witnesses:
    THEO. G. HOSTER,
    PHILIP D. ROLLHAUS.